Dec. 13, 1955 P. H. DU BOIS 2,726,811

TRANSLATING APPARATUS

Filed Aug. 23, 1954 2 Sheets-Sheet 1

Philip H. DuBois,
Inventor.
Koenig and Pope,
Attorneys.

Philip H. Du Bois,
Inventor.
Koenig and Pope,
Attorneys.

United States Patent Office 2,726,811

Patented Dec. 13, 1955

2,726,811

TRANSLATING APPARATUS

Philip H. Du Bois, Clayton, Mo.

Application August 23, 1954, Serial No. 451,329

8 Claims. (Cl. 235—61.6)

This invention relates to translating apparatus for recoding numerical information and more particularly to such apparatus associated with record-controlled machines employing record cards of the Hollerith type.

Briefly, the present invention is directed toward apparatus for translating two decimal digits, each represented as a separate index point position on a card, tape or other record, or as a single differentially timed impulse in first and second electrical circuits, into one or more spaced indications among at least eleven possible index point positions or into one or more differentially timed impulses in a single operational cycle of at least eleven sequential instants of time. This apparatus includes first and second entry-receiving inputs each adapted to be connected to one of these electrical circuits, a single electrical output connected commonly to these inputs whereby an impulse in either of the electrical circuits is transmitted to said output, and means responsive to the first and second differentially timed impulses to transmit a single additional impulse to the output only when the numerical value of a predetermined one of said decimal digits exceeds that of the other.

Among the several objects of this invention may be noted the provision of translating apparatus which will double the capacity of a Hollerith type record card for numerical data over the capacity of a card coded in the usual Hollerith coding, with no change in the format of the blank card nor in the coding of each decimal digit as a function of spatial position within a column; the provision of such apparatus which operates to recode on Hollerith type cards numerical information, originally coded in Hollerith type coding, into a new code in which two decimal digits are coded as one or more indications or impulses in a group of at least eleven index point positions in a single record card column or sequential instants of time, the new coding still utilizing the within-column spacing of conventional Hollerith coding and still preserving denominational identity of the two digits; the provision of apparatus of the class described that can utilize record cards, perforated according to conventional Hollerith coding in which there is no more than a single decimal digit in any given column, for the automatic preparation of new record cards perforated according to a different and novel coding system in which the capacity of the record card is doubled or requirements of card space for indicating a given number of items of information are halved; the provision of such apparatus adapted to be associated with conventional record-controlled machines so that they can utilize numerical data encoded in accordance with the new coding system described herein and yet be readily reconvertible to functions employing numerical data encoded in conventional Hollerith type coding; and the provision of translating apparatus which is fully compatible with most of the existing record-controlled machines employing conventional Hollerith type record cards and coding. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 illustrates a portion of a conventional Hollerith type record card perforated in six columns in accordance with the Hollerith system to indicate six decimal digits of numerical information;

Corresponding reference characters indicate corresponding parts throughout the several views of the drawings.

Figure 1:
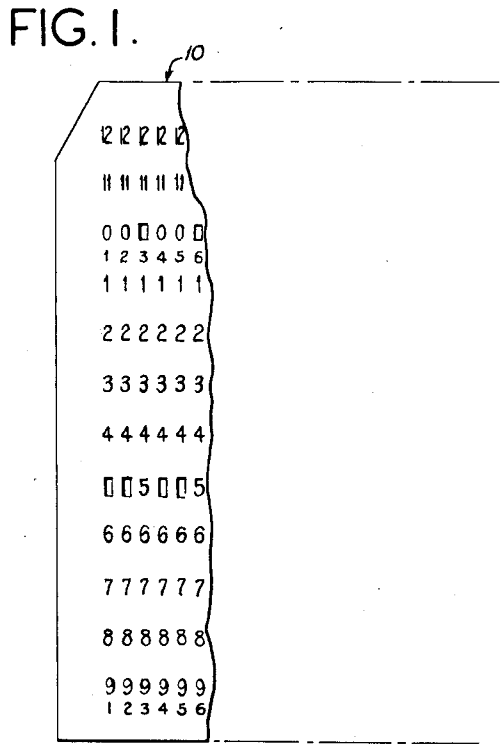

Up to the present time no system has been proposed which provides for the coding of all two digit decimal numbers from 00 to 99, inclusive, in eleven of the conventional index point positions of a Hollerith card, with zeros as well as digits of value positively indicated, while simultaneously maintaining the spatial relationships that result directly in the differential timing of impulses when the card is read in an appropriate machine. While numerous systems exist for coding two or more digits in the same column of a record card, all prior systems show one or more of the following disadvantages: (1) two different modes of indication, such as embossings in addition to conventional perforations, are required; (2) perforations of two or more different sizes or shapes are needed; (3) the number of index point positions within a column is greater than the conventional twelve; (4) no provision is made for the positive indication of zeros; (5) one of the numerous combination codes is used, which must be translated by means of a complicated translating mechanism, involving, for at least some of the digits, the substitution of one impulse for two or three impulses, or temporal displacement of impulses, or both substitution and displacement, before the coded information can be used with counters, print units and control devices adapted to a decimal differential timing code; or (6) two or more reading stations for information sensed from the same card within the same machine cycle are required.

In accordance with the present invention, translating apparatus has been developed which is free of the above disadvantages and which provides for the coding of all two digit decimal numbers from 00 to 99, inclusive, in eleven of the conventional index point positions in a single column of a Hollerith type record card while still employing the within-column spacing of conventional Hollerith numerical coding, and which operates to supply differentially timed impulses when used in accordance with the appropriate record-controlled machines. Also, the apparatus of this invention will automatically translate two digits of decimal information encoded on record cards or tapes or other medium used in controlling record-controlled machines, or standing in electrically-operated counters or storage devices, or occurring as differentially-timed electrical impulses, each digit in a separate circuit, into a novel form of numerical coding in which two digits are uniquely represented as one, two or three perforations formed at one, two or three of eleven index point positions in a single column of a record card, or as one, two or three differentially timed impulses in an electrical circuit, these latter impulses being distributed among eleven possible instants of time occurring within a portion of a machine cycle, with at least ten of said instants of time being equally spaced.

In view of the fact that the present invention relates to translating apparatus which automatically recodes numerical information coded in conventional Hollerith type code into a novel coding system, the two coding systems will be compared. In Hollerith coding, an indication, such as a perforation, in one of ten index point positions of a column of a record card, yields digital meaning through a time differential in some type of sensing, such as the completion of an electrical circuit through the perforation giving rise to a differentially timed impulse. This differentially timed electrical impulse can be used to start or stop the rotation of a counter wheel or to cause the operation of a perforating device as by operating a magnet, or to control in other ways the functions of an accounting or statistical machine, or other record-controlled machine. In the coding system (designated hereinafter as bidecimal coding) into which the instant apparatus translates numerical information, ten index point positions are also assigned values of 0 to 9. In Hollerith coding only one of these positions in any set of ten is used to indicate a decimal digit. In bidecimal coding a group of ten index point positions, plus an eleventh or extra position, hereinafter designated the "E-position," is used to indicate two decimal digits. One of these digits is arbitrarily called the "tens-digit," the other the "units-digit," it being understood that these denominational designations are in no sense restrictions, since the two digits may actually be parts of the same or of different multi-digit numbers or may be independent single-digit numbers. Normally the tens-digit is printed or entered in a counter or otherwise used to the left of the units-digit.

In bidecimal coding the two digits are placed in exactly the same index point positions within the column and with the same method of indication as if the Hollerith system were used. In the preferred variation of bidecimal coding, only a single index point position, namely, the digital position with the assigned value corresponding to the value of each of the digits, is used when the tens-digit and units-digit are equal. In the same embodiment, the eleventh index point position or E-position, by the presence or absence of a positive indication, indicates, when digits are indicated in two of the ten digital index point positions, whether the larger digit is the units-digit or the tens-digit.

It is to be noted that, in the bidecimal coding used in the apparatus of the present invention, the E-position can be assigned one of several meanings, such that there is positive indication in the E-position when: (1) the units-digit is larger than the tens-digit; or (2) the tens-digit is larger than the units-digit; or (3) the units-digit is equal to or larger than the tens-digit; or (4) the tens-digit is equal to or larger than the units-digit. Furthermore, for reasons of engineering convenience, it may in some variations of bidecimal coding be desirable to distribute the functions of the eleventh position between two positions outside the regular ten digital index point positions, as in using a twelfth position further to distinguish the case in which the tens-digit and units-digit are equal. Also, it will be noted that in utilizing bidecimal coding the order of reading the digital positions may be from 0 to 9 as well as from 9 to 0, and the extra position or positions may be read before or after the digital positions. Some of the variations referred to above are, of course, actually mutual duplications, since within the same system of record-controlled machines the order of reading the same data may vary.

In the preferred embodiment of translating apparatus particularly described herein, the bidecimal coding utilizes for each set of two digits eleven of the twelve index point positions of a single column of the conventional Hollerith card. The E-position is arbitrarily assigned the function of indicating that the units-digit is greater than the tens-digit, and the normal order of reading of the index point positions is 9, 8, 7, 6, 5, 4, 3, 2, 1, 0, and E. Also, an indication in a single digital position unaccompanied by a positive indication in the E-position means that two equal digits are indicated. For convenience, the 11- or X-position of the conventional Hollerith card will be assigned the functions of the E-position, although the position variously known as the 12- or Y- or R-position could be used by making changes that will be readily apparent to those skilled in the art.

Also, in the preferred embodiment of the present invention, the bidecimal coding variation described above is particularly advantageous in that present types of record cards can be used without change, that the meanings of the codings are readily apparent and that each column has an unused index point position to which functions other than the indication of numerical information can be assigned. It will be clearly understood, however, that the principle of the invention can be used equally well with other variations of bidecimal coding.

The complete coding system for this preferred variation of bidecimal coding for all combinations of two digits from 00 to 99 follows:

| Decimal | Bidecimal | Decimal | Bidecimal |
|---|---|---|---|
| 00 | 0 | 50 | 05 |
| 01 | 01E | 51 | 15 |
| 02 | 02E | 52 | 25 |
| 03 | 03E | 53 | 35 |
| 04 | 04E | 54 | 45 |
| 05 | 05E | 55 | 5 |
| 05 | 06E | 56 | 56E |
| 07 | 07E | 57 | 57E |
| 08 | 08E | 58 | 58E |
| 09 | 09E | 59 | 59E |
| 10 | 01 | 60 | 06 |
| 11 | 1 | 61 | 16 |
| 12 | 12E | 62 | 26 |
| 13 | 13E | 63 | 36 |
| 14 | 14E | 64 | 46 |
| 15 | 15E | 65 | 56 |
| 16 | 16E | 66 | 6 |
| 17 | 17E | 67 | 67E |
| 18 | 18E | 68 | 68E |
| 19 | 19E | 69 | 69E |
| 20 | 02 | 70 | 07 |
| 21 | 12 | 71 | 17 |
| 22 | 2 | 72 | 27 |
| 23 | 23E | 73 | 37 |
| 24 | 24E | 74 | 47 |
| 25 | 25E | 75 | 57 |
| 26 | 26E | 76 | 67 |
| 27 | 27E | 77 | 7 |
| 28 | 28E | 78 | 78E |
| 29 | 29E | 79 | 79E |
| 30 | 03 | 80 | 08 |
| 31 | 13 | 81 | 18 |
| 32 | 23 | 82 | 28 |
| 33 | 3 | 83 | 38 |
| 34 | 34E | 83 | 48 |
| 35 | 35E | 85 | 58 |
| 36 | 36E | 86 | 68 |
| 37 | 37E | 87 | 78 |
| 38 | 38E | 88 | 8 |
| 39 | 39E | 89 | 89E |
| 40 | 04 | 90 | 09 |
| 41 | 14 | 91 | 19 |
| 42 | 24 | 92 | 29 |
| 43 | 34 | 93 | 39 |
| 44 | 4 | 94 | 49 |
| 45 | 45E | 95 | 59 |
| 46 | 46E | 96 | 69 |
| 47 | 47E | 97 | 79 |
| 48 | 48E | 98 | 89 |
| 49 | 49E | 99 | 9 |

It will be noted that in the above table each two digit number in decimal notation has its unique equivalent in bidecimal notation and that each of the 100 disclosed combinations of bidecimal indications, irrespective of the order in which the components of each combination are shown, has a unique equivalent in conventional decimal notation, such equivalent being a two digit number.

It will be readily apparent from the above description that bidecimal coding as employed in conjunction with the present invention is not to be confused with binary coding or with the numerous types of combinational codes which are sometimes used to increase the data-holding capacity of records used in controlling statistical, computing and accounting machines.

As is well-known, true binary coding is a number system with the radix two instead of the radix ten of decimal notation. Successive index point positions are assigned values of successive powers of 2, beginning with $2^0$ or 1. The values in decimal notation of successive index point positions are thus 1, 2, 4, 8, 16, 32, 64, 128, etc. The sum of the values of the index point positions positively indicated is the value of the number in decimal notation. Binary coding is used extensively in certain high speed computing and data processing machines, and methods are well-known for converting binary coding into Hollerith decimal coding.

The distinguishing characteristic of the combinational codes is that four to six index point positions are used to convey a single decimal digit of information. Denominational order is assigned to each group of index point positions. One example of a combination code is binary-decimal coding, in which the four index point positions designated to carry each decimal digit are assigned values of 1, 2, 4 and 8, and the sum of the values of the positions positively indicated is the value of the digit. In this particular combination code no provision is made for the positive indication of 0. All combination codes require that for at least some of the decimal digits there be positive indications in more than a single index point position.

In certain of the combination codes, such as the binary-decimal code cited above, each index point position has a fixed value and the sum of the values of the positions positively indicated is the value of the encoded decimal digit. The so-called Peirce code is arbitrary in that the four index point positions have no fixed values, but all digits from 0 to 9 are represented by a single index point position or a unique combination of two such positions. United States Patent 1,658,024 discloses a method of translating the Peirce code or any other combination code into the Hollerith differential timing code. Other means of translating combinational codes into the Hollerith code are well-known in the art. Thus, the bidecimal coding employed in conjunction with apparatus of the present invention is to be sharply differentiated from combination or binary coding. However, if the translating apparatus disclosed herein is combined with any of the conventional apparatus for translating from combination or binary coding into Hollerith coding, then binary or combination coding can be translated into bidecimal coding.

In the present instance, also, the invention will be illustrated with special reference to perforated records of the type used in the Hollerith system of recording accounting and statistical data. However, it will be readily understood that the present invention is not restricted to use with perforated record cards, sheets or tapes. Like Hollerith coding, bidecimal coding can be used on record cards with indications other than perforations, such as indications in the form of electrically conductive pencil marks, or as magnetized indications on magnetic cores, drums or tapes, or, broadly speaking, whenever the differential spacing of indications in the record is directly correlated with the differential timing of electrical impulses in circuits in the machine.

Figure 2:
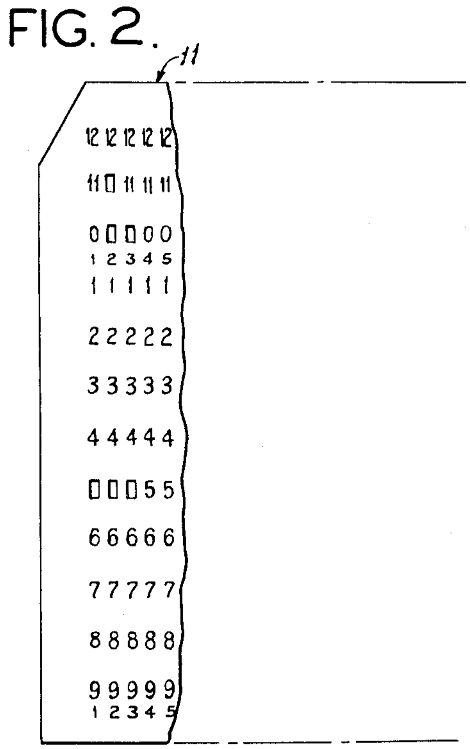
Fig. 2 illustrates a portion of a conventional Hollerith type record card as perforated by apparatus of the present invention to indicate in three columns a corresponding six decimal digits of numerical information.

Referring now to Fig. 1, there is shown a portion of a conventional tabulating card of the Hollerith type in which the multiple digit number 550,550 is indicated in conventional Hollerith coding by a single perforation in each of the first six columns, each digit therefore being represented at an index point position in a separate column. In Fig. 2 the identical multiple digit number 550,550 is indicated in a preferred variation of bidecimal coding by perforations in only three columns, two digits being indicated in each column. In the first of these three columns of the Fig. 2 record card there is a single perforation with a digital value of 5, which in this variation of bidecimal coding carries the value of 55. In the next column there are three perforations, two digital perforations with values of 0 and 5, together with a perforation in the assigned E-position, which in this example is the X- or 11-position. Since E is positively indicated, the "units-digit" of this combination is greater than the "tens-digit," and hence the value of 05 is indicated. In the third column there are two digital perforations, with values of 0 and 5, unaccompanied by an E-perforation. Accordingly, the "tens-digit" is greater than the "units-digit" in this column and a value of 50 is indicated.

Bidecimal coding provides, therefore, for the preservation of denominational information for the combination of two digits within each column, but from column to column denominational relationships are indicated, generally speaking, in the conventional fashion, that is, within the same number parts of the number to the left have higher denominational orders than parts of numbers to the right. Accordingly, the complete multiple digit number indicated in the three columns is 550,550, exactly the same as indicated in the six columns in Fig. 1.

The invention disclosed herein will be described with reference to an electric means of sensing the data in the records and translating such data directly into electrical impulses which are utilized to control the functions of the machine, and for this purpose the invention is disclosed as utilizing information from electrical sensing brushes. It is clear, however, that the brushes may be replaced by photocells or similar devices which do not necessarily have any direct contact with the record for the purpose of analyzing the data, or by a frictional sensing device. Furthermore, the invention is disclosed partly in terms of "relays," "magnets" and "rectifiers." It is to be understood that, as used in this disclosure and the subsequent claims, the term "relay" refers to any type of mechanical or electrical switch, electronic tube, transistor, selector or distributor, by which the flow of an electric current (called the "output signal") is changed from one route to another, or is interrupted, or is given a route, in response to the action of another electric current (called the "control signal"), while the term "magnet" refers to any part of a "relay" which is directly actuated by the "control signal." The term "rectifier" as used herein refers to any device, such as a selenium or copper oxide rectifier or vacuum tube, which, when used in a circuit, permits the passage of current in one direction only. Also, delay in relay action has been secured through the use of a prior acting relay. Other methods of securing delay in a relay are well-known in the art and may sometimes be preferred for practical reasons of economy.

Holding circuits used for holding a relay closed for a period of time subsequent to the activation of the relay by a control signal are disclosed as permitting the passage of current through the same winding as is used for initial actuation. It may be convenient, however, to employ doubly wound magnets, using one coil for the actuating circuit and the other for the holding circuit. Such arrangements are well-known in the art, when magnet-type relays are used.

The translating apparatus of the present invention may be used with any of a large number of record-controlled machines, but for the sake of brevity, it will be described in connection with a perforating or punching device capable of operation at high speed for reproducing perforated record cards. The specific device used for illustration is that disclosed in U. S. Reissue Patent 21,133. Since the organization of parts and the operation of this perforating device are fully set forth in the above-cited patent, a description of its action will be set forth herein only to the extent necessary to facilitate understanding of the present invention.

In the perforating machine disclosed in said Reissue Patent 21,133 cited above, a plurality of punches (one for each card column) is arranged in a single line across the length of the record card so that only twelve steps of movement are needed to punch a card completely, regardless of the columnar capacity. A Geneva drive gear feeds the cards in synchronism and with intermittent and gradually accelerated movement.

Figure 4:
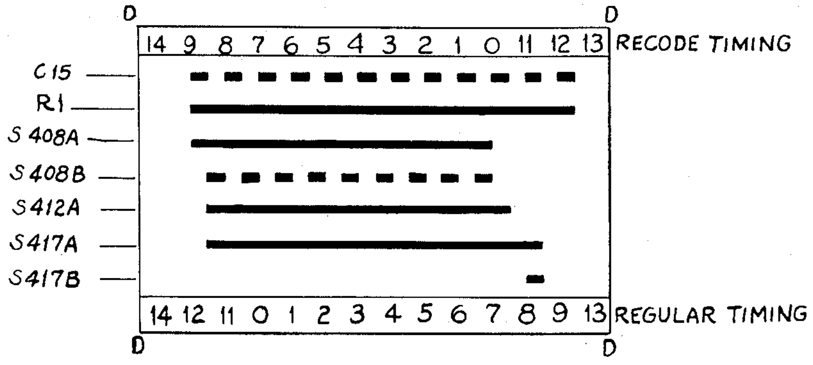
Fig. 4 is a chart illustrating the timing of circuit making and breaking devices employed in the apparatus of Fig. 3.
Figure 3:
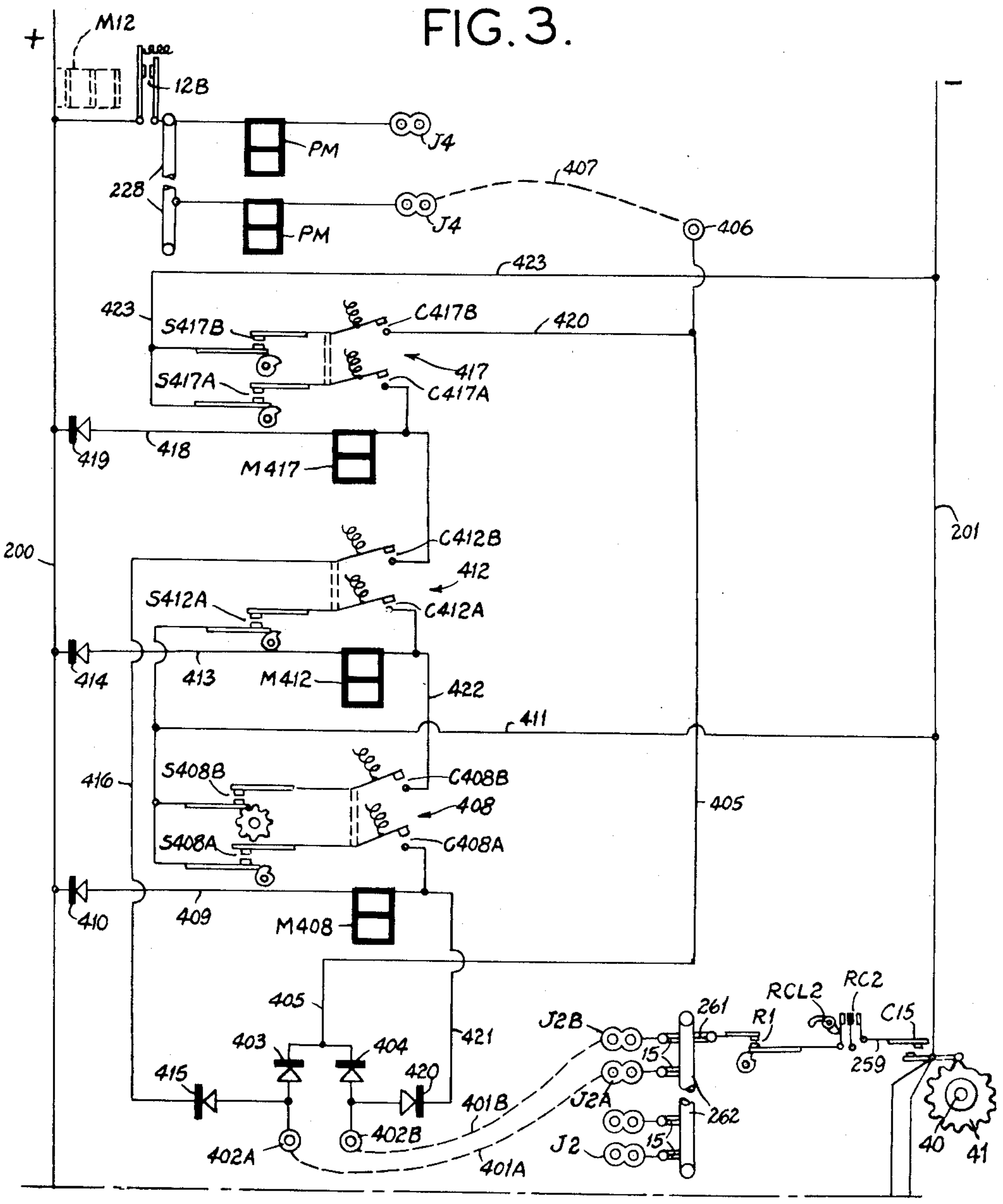
Fig. 3 is a circuit diagram of an exemplary translating apparatus of the present invention.

When the machine is conditioned for operation in conjunction with translating or recoding apparatus of the present invention, Hollerith type record cards are fed in synchronism from two feed hoppers, as indicated in Figs. 3 and 4 of Reissue Patent 21,133 at reference designations R and P. An interlock prevents starting of the machine until cards are in both hoppers. Hopper R contains the pattern or original cards 10 that are already perforated in Hollerith coding. Hopper P holds the blank cards 11 which are to be perforated in bidecimal coding. As the cards are fed from the hoppers, a pattern card 10 and an associated blank card 11 are simultaneously placed in related feeding rollers and then moved along concurrently and in synchronism, the blank card having an intermittent movement. The pattern card 10 passes a sensing station and the blank card 11 passes a punching station. The cards are of the regular Hollerith form and are fed laterally across the short width with the nine index point position leading. This is a change from the ordinary use of this machine, since for ordinary reproducing the cards are customarily fed with the twelve index point position leading. The reason for the change to the nine index point position leading is that any perforations in the 11- or E-position are formed after the numerical positions are sensed and punched. Each of the blank cards 11 pauses momentarily at each index point position so that if a perforation is to be made the punch has time to penetrate and withdraw from the punched card. The intermittent motion of the card is brought about by the use of a Geneva step motion gearing connected to the card-feeding rollers.

The blank card is drawn under a single line of punches, there being one punch for each column of index points on the card, the card moving to bring the various index point positions successively under the punches. At the same time that the blank card is passing under the single line of punches, the pattern card is passing over a single line of sensing brushes. As will be described in detail below, in translating into bidecimal coding each pair of sensing brushes is connected to a single magnet for controlling a single related punch.

The pattern card 10 is sensed at each line of index points by pairs of brushes, and, if a perforation appears, a circuit is established through one of the punch control magnets the armature of which is connected by a call wire to an interposer pawl articulated on the end of a punch plunger. The pawl has a shoulder normally out of the path of a positive actuator, which is reciprocated as each index point is sensed. If the pawl is selected, it tends to engage the actuator and does so when the actuator lowers out of the way of a cam face on the pawl. Another cam face on the pawl cooperates with the stationary bar to hold the pawl positively into engagement with the actuator during the punching and retracting movement.

It will be noted that components in Figs. 3 and 4 herein correspond to those in Figs. 10A and 10B in the above-cited reissue patent where corresponding reference characters are utilized. Reference characters above 400 designate additional components and circuits which have been organized with the Fig. 10B circuit components to form an exemplary translating device of the present invention.

D. C. power of the polarity indicated is supplied via lines 200 and 201 to the components of Fig. 3 herein. An impulse distributor wheel 41 is keyed to a shaft 40 which is driven continuously by a gear 39 which in turn is driven by gear 37 (Fig. 1 of Reissue Patent 21,133). This shaft 40 also drives a plurality of switch operating cams in synchronism with the movement of impulse wheel 41 and the movement of the pattern and blank record cards. The rotation of impulse distributor wheel 41 causes its associated contacts C15 to be opened and closed in the pattern indicated in the first row of Fig. 4 by reference character C15. The intermittent closure of contacts C15 provides, in effect (by completing an electrical circuit), a series of electrical impulses of equal duration spaced apart in short equal time increments or intervals (e. g., 1/40 of a second) and differentially timed in relation to an arbitrarily preselected instant of time, such as the moment of time when the pattern record cards (9-position leading) are initially positioned at the line of brushes 15. Thus, a series of differentially timed impulses, in a single operational cycle of at least eleven (twelve in the specific instance) possible sequential instants of time are available via wire 259 at the contacts RC2. These contacts are closed each time card lever RCL2 is operated by a pattern card 10 passing between brushes 15 and contact roller 262. The line of sensing brushes 15 (one for each column of card 10), contact roller 262 and common brushes 261 constitute a sensing station through which the pattern cards are fed.

Contacts R1 are keyed to shaft 40 and are closed continuously from the beginning to the end of each operational cycle, that is, from the time of reading the nine index point position down through the time of reading the eleven index point position (used as the E-position in this exemplary embodiment) and the twelve index point position (not used in this exemplary embodiment). Thus, an electrical circuit from each of the brushes 15 to the negative polarity line 201 is completed and a differentially timed impulse is formed any time a perforation in a pattern card 10 appears between any brush 15 and roller 262. The advance of each pattern card 10 through the sensing station is in synchronism with the instants of closure of contacts C15 which, therefore, correspond to the instants of alignment of the perforations between any brush 15 and roller 262.

The numerical information (a single decimal digit) in any column or pattern card 10 is represented by a single differentially timed impulse which is conducted to separate jacks or sockets J2, J2A, J2B, etc. (one for each of the columns of pattern card 10) any time a perforation appears between its associated brush and contact roller 262. The dashed lines 401A and 401B represent plug wires or cords respectively interconnecting sockets J2A and J2B to a pair of entry-receiving sockets or inputs 402A and 402B. The brush 15 connected to J2B will be used in this exemplary embodiment to sense the units-digit, and the brush 15 connected to J2A is employed to sense the tens-digit.

Inputs 402A and 402B are connected commonly via a pair of rectifiers 403 and 404 respectively to a wire 405 and a jack or socket 406. Socket 406 is adapted to be interconnected via a plug wire 407 to a socket J4. A circuit from the positive polarity line 200 via contacts 12B (closed during recoding operations as disclosed in the present disclosure and opened only in connection with gang punching operations as disclosed in Reissue Patent 21,133) to punch magnet PM and socket J4 is provided so as to energize PM to punch a perforation in a record card 11 positioned thereunder every time a differentially timed impulse is present at output socket 406.

The completion of the above circuit to punch magnet PM (in effect the transmitting of differentially timed impulses to punch magnet PM) results, as described above, in forming a perforation in any index point position in a single column of blank record card 11 corresponding to each perforation in the tens-digit and units-digit columns of the pattern card 10 being sensed. Thus, if the tens-digit and the units-digit are different, two different perforations appearing in two different columns in the pattern card will appear at corresponding columnar positions in a single column in the record card 11. If the two digits in the two pattern card columns are identical, only one perforation in a single column of the record card 11 is produced.

Means by which digit representations in pairs of columns in the pattern card can result in one- or two-digit representations in single columns of the card carrying the translation have been described above. What will now be described is a means for controlling a magnet PM in such a way that a perforation will be made in a column in the E-position if the units-digit is larger than the tens-digit, but with no perforation in the E-position if the units-digit is smaller than the tens-digit. These means are responsive to the first and second differentially timed impulses (representing the tens- and units-digits, respectively, to add an impulse at E-time in the card cycle to the combined circuit leading to PM under the prescribed conditions in this exemplary embodiment when the units-digit is larger than the tens-digit.

Referring now to Fig. 4, there are displayed diagrammatically the timings of the several circuit breaking devices. In the present embodiment of this invention, these devices are cam-operated switches keyed to shaft 40, a complete revolution of which is represented as the complete cycle from D to D. This cycle, during which one pattern card passes the reading brushes and one blank card passes the punching brushes, is divided into 14 equal divisions of time. The pattern card 10 is under the reading brushes and the blank card 11 is under the punches for the twelve divisions of the cycle designated as 9, 8, 7, 6, 5, 4, 3, 2, 1, 0, 11 and 12 for the "recode timing" of the present disclosure, these numbers corresponding to the conventional index point positions and intervening spaces of the tabulating card.

As stated earlier, the cards are fed in connection with the present embodiment with the nine edge leading. If the cards are fed with the twelve edge leading, as is ordinarily the case in the use of the machine described in Reissue Patent 21,133, these twelve divisions of the cycle would be designated 12, 11, 0, 1, 2, 3, 4, 5, 6, 7, 8, and 9, as indicated for "regular timing." It is to be noted that approximately half of each of these divisions corresponds to the time the perforation is read and half to the time between perforations or at an edge of the card. It is also to be noted that divisions of time designated as 13 and 14 correspond to no index point positions on the card but rather are divisions of the cycle when no card is at reading or punching stations.

It will be noted that an impulse encoding a numerically greater decimal digit (e. g., 5) occurs in a card or operational cycle before an impulse encoding or representing a digit of lesser numerical value (e. g., 0). Therefore, if the units-digit is larger than the tens-digit, the differentially timed impulse representing this units-digit is transmitted to input 402B before the impulse representing the tens-digit is received by input 402A. The impulse representing the units-digit is transmitted not only along line 405, but is also applied to wire 421 via a rectifier 420. A magnet M408 of a relay 408 is energized via a completed electric circuit from line 201 (via contacts C15, RC2, R1, roller 262, brush 15, perforation in card 10, socket J2B, wire 401B, socket 402B, rectifier 420 and wire 421) through a wire 409 and a rectifier 410 to positive polarity lead 200. Upon energization of this magnet by receipt of a timed electrical impulse from socket 402B, a pair of relay contacts C408A and C408B is closed. The closure of contacts C408A completes a holding circuit for magnet M408 from line 201, via a wire 411 and a set of cam-operated switch contacts S408A. This holding circuit will remain completed as long as switch S408A stays closed. The actuation status of switch S408A is shown in Fig. 4 to be closed from the beginning of "9" time in the cycle to the beginning of "0" time, and consequently relay 408 will be in operated condition from the time of any units impulse greater than 0 to the beginning of "0" time. The closure of contacts C408B completes a circuit to a magnet M412 of a second relay 412 from line 201 (via wire 411, a pair of cam-operated switch contacts S408B, relay contacts C408B and a wire 422) through a wire 413 and a rectifier 414 to line 200. It will be noted from Fig. 4 that the cam-operated switch S408B is timed to close at the instant following each digit indicating timed impulse until the beginning of the following digit indicating timed impulse. That is, referring to the timing chart of Fig. 4, it will be seen that the switch S408B energization periods are complements of those of contact C15. The reason for this staggered timing relationship will be set forth in greater detail below. When thus actuated by a decimal digit representing impulse from the units-digit column, relay 412 will be actuated after (but not during) an impulse representing a units-digit greater than zero.

A holding circuit for relay 412 is provided, comprising wire 411, a cam-operated timing switch S412A, and a set of relay contacts C412A. This holding circuit maintains contacts C412B and C412A continually closed from the time of the initial actuation of relay 412 until the end of "0" time in the cycle (Fig. 4).

Closure of contacts C421B completes a circuit between input 402A (the tens-digit input) via a rectifier 415, a relay magnet M417, a wire 418 and a rectifier 419 to line 200. The closure of contacts C412B thereby conditions relay 417 for energization upon the transmission of a tens-digit impulse received by input 402A subsequent to the receipt of a unit impulse by input 402B. Energization of magnet M417 by such an impulse closes contacts C417B and C417A of relay 417. A holding circuit for magnet M417 is thereby completed from line 201 through a cam-operated switch S417A, contacts C417A to magnet M417 to line 418 to rectifier 419 to line 200. A circuit to wire 405 (from line 201 via a wire 423, a cam-operated switch S417B, contacts C417B and wire 420) adapted to transmit an additional synchronously timed impulse to punch magnet PM is thereby set up. Switch S417B will close only in accordance with the movement of its timing cam, which as shown in the bottom row of Fig. 4 results in actuation of this switch S417B to a closed position only during the 11- or E-instant of time during each operational cycle. The transmission of this impulse at a delayed instant of time thereby actuates the punch magnet PM to perforate the record card 11 in the E-position. The closure of relay contacts C417B depends, of course, upon the maintenance of the holding circuit through switch S417A. It will be seen in the timing chart of Fig. 4 that this switch is operated so as to be closed from the time representing the end of the 9-indicating impulse until a time after the E-impulse.

Operation of these means for supplying the E-impulse to the output socket 406 is as follows: Assuming that the tens-digit is 0 and the units-digit is 5 (as represented by the perforations in the two decimal digit information-carrying columns 3 and 4 of Fig. 1), the first impulse to be received at inputs 402A or 402B is the units-digit input representing decimal digit 5. It is transmitted to output 406 and actuates punch magnet PM to punch a blank record card 11 at the 5 index point position (as indicated in column 2 of the Fig. 2 card). This same 5-impulse is connected via wire 421 to energize relay 408. As described above, the resulting closure of relay contacts C408B will cause actuation of relay 412. A slight delay between the closing of contacts C408B and the energization of relay 412 is provided by the timing of closure of switch S408B (see Fig. 4). This delay insures that relay 412 will not close contacts C412B so soon as to pass a like (in this instance at 5-time) impulse, which may be simultaneously impressed on wire 416, to magnet M417. If relay 412 were closed immediately upon magnet M408 being energized by a units-digit impulse, it would be possible that two like tens-digit and units-digit impulse would cause energization of magnet M417 and the inadvertent resultant production of an E-impulse at output 406.

The closure of contacts C412B conditions the circuit via wire 416 from tens-digit input 402A to magnet M417 for energization upon the arrival of an impulse at a time in the card cycle between 4 and 0, inclusive. Upon transmission of the 0-impulse to input 402A, the 0-impulse energizes punch magnet PM (via wire 405) to perforate column 2 of the Fig. 2 card at 0. Also, the 0-impulse is impressed upon magnet M417 (via wire 416 and contacts C412B). Therefore, contacts C417B are closed so that at E-time an E-impulse (caused by closure of switch S417B) is transmitted to punch magnet PM to perforate column 2 of the Fig. 2 card at the E-position. Thus, the two decimal digit numeral 05 is translated from conventional Hollerith coding to bidecimal coding without loss of within-column timing or loss of denominational order.

If the two decimal digits encoded were 55, as indicated at columns 1 and 2 of the Fig. 1 card, a single perforation at the 5-position would be formed in column 1 of the Fig. 2 card as the merged differentially timed impulses at 5-time energize punch magnet PM. The actuation of relays 408 and 412 would not cause energization of relay 417 (and thus transmit an E-impulse) because no impulse will be transmitted from the tens-digit input after the units-digit 5-impulse causes relay 412 to close. The holding circuit for relay 412 (via S412A) is broken at the beginning of 11- or E-time, thus conditioning the apparatus for another operational cycle.

The other remaining possibility, where the tens-digit is greater than the units-digit (e. g., in the number 50), is represented in columns 5 and 6 of Fig. 1. As in the previous conditions of operation the 5-impulse is transmitted first and it actuates punch magnet PM to perforate card 11 (Fig. 2) in column 3 in the 5-position. However, a circuit from input 402A via contacts C412B to magnet M417 is not completed (relays 408 and 412 being deenergized until a units-digit impulse is received) at the time the 5-impulse is received by input 402A. Thus relay 417 is not closed and no E-impulse is transmitted. The subsequent transmission of the 0 units-digit impulse to socket 406 via wire 405 results in a perforation at the 0-position in column 3 of card 2. However, the actuation of relays 408 and 412 by this units-digit impulse does not cause energization of relay 417 because no later timed impulse remains to trigger magnet M417. The breaking of the holding circuit of relay 408 by the opening of switch S408A (Fig. 4) deenergizes relays 408 and 412 and conditions the apparatus for the next operational cycle.

It will be noted that, for normal operation of the punch as a straight reproducing mechanism, plug sockets of the order J2A and J2 are plugged directly to plug sockets of the order J4, thus skipping the translating device of the present invention and providing convenient reconversion of the machine to the conventional Hollerith coding.

The above specifically disclosed embodiment of the present invention can be readily modified to cover all instances of the translation of numerical material in the Hollerith code into bidecimal coding in its several variations, when the sources of the two digits in the Hollerith code to be recoded can be read or sensed simultaneously. For example, in the present disclosure, the form of bidecimal coding illustrated is one in which the higher digits are read, and punched or otherwise indicated prior to the lower digits. If the reverse were true, it would be necessary only to interchange the wires into sockets 402A and 402B.

Similarly if a bidecimal coding system were used in which the E-position or positions were normally read before the numerical positions, the feeding of the records in conventional coding and the records to be produced in bidecimal coding need only be adjusted so that the numerical positions were sensed first, together with such changes in the circuits as would be apparent to those skilled in the art. If a variation of bidecimal coding were adopted which included, as indicated above, a special indication for the case in which the units-digit and tens-digit are equal, the modification required would be similarly obvious to one skilled in the art.

While the invention has been illustrated as applied to a perforating machine designed to transfer information from pattern cards to new cards, it is to be understood that the invention is applicable to (1) any record card perforating machine controlled by differentially-timed impulses, whether or not such impulses are originated directly by means of records, provided, of course, that the perforating machine operates line by line rather than column by column. The source of such impulses can be the familiar read-out devices of many and varied types of record-controlled machines, such as tabulating machines, statistical machines, accounting machines and computing machines. Furthermore, the invention can be incorporated within various well-known types of calculating punches, which are controlled by perforated record cards, and which can be adjusted to perform arithmetical operations utilizing the information encoded on the records, and then indicate the result on the record itself. By application of this invention the output of such machines can be indicated in bidecimal code.

While it is more convenient to apply the invention to types of machines in which the output hitherto has been in terms of the Hollerith differential timing code, the invention is obviously applicable to any machine or system of machines the output of which can be translated into Hollerith code.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for translating two decimal digits, represented by single first and second differentially timed impulses respectively in first and second electrical circuits, into one or more differentially timed impulses in a single operational cycle of at least eleven possible sequential instants of time, said apparatus comprising a pair of electrical inputs each adapted to be connected to one of said electrical circuits, a single electrical output connected commonly to said pair of electrical inputs whereby an impulse in either of said circuits is transmitted to said output, and means responsive to said first and second differentially timed impulses to transmit a single additional impulse to said output only when the numerical value of a predetermined one of said decimal digits exceeds that of the other.

2. Apparatus as set forth in claim 1 in which said output is connected to energize an electrically actuated punch adapted to perforate index point positions in one column of a record card.

3. Apparatus as set forth in claim 1 in which said output is connected to energize a magnetizing device adapted to magnetize index point positions of a record.

4. Apparatus for translating two decimal digits, represented by single first and second differentially timed impulses respectively in first and second electrical circuits, into one or more differentially timed impulses in a single operational cycle of at least eleven possible sequential instants of time, said apparatus comprising a pair of electrical inputs each adapted to be connected to one of said electrical circuits, a single electrical output connected commonly to said pair of electrical inputs whereby an impulse in either of said circuits is transmitted to said output, means adapted to supply an additional synchronously timed impulse once every operational cycle, and means responsive to said first and second differentially timed impulses to interconnect said supply means to said output and thus transmit a distinguishing additional impulse to said output only when the numerical value of a predetermined one of said decimal digits exceeds that of the other.

5. Apparatus for translating two decimal digits, represented by single first and second differentially timed impulses respectively in first and second electrical circuits, into one or more differentially timed impulses in a single operational cycle of at least eleven possible sequential instants of time, said apparatus comprising a pair of electrical inputs each adapted to be connected to one of said electrical circuits, a single electrical output connected commonly to said pair of electrical inputs whereby an impulse in either of said circuits is transmitted to said output, a source of impulses synchronously timed to occur once every operational cycle, and means responsive to said first and second differentially timed impulses to interconnect said source to said output and thus transmit a distinguishing additional impulse to said output only when the numerical value of a predetermined one of said decimal digits exceeds that of the other.

6. Apparatus for translating two decimal digits, represented by single first and second differentially timed impulses respectively in first and second electrical circuits, into one or more differentially timed impulses in a single operational cycle of at least eleven possible sequential instants of time, said apparatus comprising a pair of electrical inputs each adapted to be connected to one of said electrical circuits, a single electrical output connected commonly to said pair of electrical inputs whereby an impulse in either of said circuits is transmitted to said output, means adapted to supply an additional synchronously timed impulse once every operational cycle, and a relay responsive to said first and second differentially timed impulses to interconnect the supply means to said output and thus transmit a distinguishing additional impulse to said output only when the numerical value of a predetermined one of said decimal digits exceeds that of the other.

7. In a record-controlled machine having first and second circuits each customarily adapted to carry one decimal digit of information per operational cycle, each digit represented by a separate differentially timed impulse; first and second entry-receiving inputs each adapted to be connected to one of said circuits, a single electrical output connected commonly to said inputs whereby an impulse from either of said circuits is transmitted to said output, and means responsive to the first and second differentially timed impulses to transmit a single additional impulse to said output only when the numerical value of a predetermined one of said decimal digits exceeds that of the other.

8. In a record-controlled machine having first and second circuits each customarily adapted to carry one decimal digit of information per operational cycle, each digit represented by a separate differentially timed impulse; first and second entry-receiving inputs each adapted to be connected to one of said circuits, a single electrical output connected commonly to said inputs whereby an impulse from either of said circuits is transmitted to said output, means adapted to supply an additional synchronously timed impulse once every operational cycle, and relay means responsive to the first and second differentially timed impulses to interconnect the supply means to said output and thus transmit a distinguishing additional impulse to said output only when the numerical value of a predetermined one of said decimal digits exceeds that of the other.

No references cited.